Patented July 21, 1953

2,646,442

UNITED STATES PATENT OFFICE 2,646,442

HYDROCARBON SYNTHESIS

Marcus T. Kendall, Long Beach, Calif., assignor to The Texas Company, New York, N. Y., a corporation of Delaware No Drawing. Application June 4, 1948, Serial No. 31,225

12 Claims. (Cl. 260—449.6)

The present invention relates to the synthesis of hydrocarbons, oxygenated hydrocarbons and mixtures thereof by the catalytic reduction of carbon monoxide with hydrogen.

The invention more particularly involves placing and maintaining a synthesis catalyst in a condition favorable to realization of new and improved yields of desired products. It contemplates the continuous production of desired products with the catalyst in an improved state of conditioning, while spent catalyst is withdrawn in the form of extreme fines and the catalyst bed is continuously or periodically supplemented by addition of corresponding quantities of fresh catalyst.

In accordance with the present invention, it has been discovered that hydrocarbon synthesis catalysts containing iron may be caused to exert materially improved catalytic activity for the conversion of hydrogen and carbon monoxide directly into normally liquid hydrocarbons, oxygenated hydrocarbons and mixtures thereof, when so conditioned that from about 60 to 85 per cent of the catalyst particles in the reaction zone are within the size range of from 10 to 80 microns and have an average particle density of about 2.5 to 4.5, and a surface adsorptivity of about 20 to 45 milliliters of $NH_3$ per gram of catalyst.

Preferably, the optimum proportion of particles within the 10 to 80 micron size range is from about 65 to 75 per cent of the total mass of catalyst particles in the reaction zone. Moreover, the preferred catalyst particle density is in the range from about 3.0 to 4.0, and the surface adsorptivity from 30 to 45, on the foregoing basis.

As intimated above, the invention is concerned with iron-containing synthesis catalyst produced by the reduction and conditioning of an iron compound, such as one of the iron oxides, for example, $Fe_2O_3$, $Fe_3O_4$, FeO, mill scale, pyrites ash, or the iron ores such as magnetite, hematite or limonite, susceptible of being reduced to the metallic state in a stream of hydrogen at an elevated temperature.

Reduction is usually carried out at a temperature in the range of about 500–1000° F. with continual return of a dry recycle stream of unreacted hydrogen, until reduction is partially or fully completed, as desired.

Thereafter, a period of so-called carbiding places the catalyst in a condition of activity. Carbiding may be effected by passage of synthesis gas under synthesis conditions, or by treatment with synthesis gas at temperatures which are slowly increased to the normal operating level. By such treatment the catalyst is rendered both chemically and physically effective for the direct conversion of a mixture of hydrogen and carbon monoxide into hydrocarbons, oxygenated hydrocarbons and mixtures thereof under suitable conditions of temperature and pressure. For example, normally liquid hydrocarbons are produced at a suitable temperature in the range of 550–700° F., usually between about 600° F. and 650° F., under superatmospheric pressure, for instance 150 to 450 pounds per square inch gauge.

However, the chemical and possibly physical changes effectuated during such catalyst preparation tend to result in a catalyst state which is inappropriate for maximum yield of desired liquid products.

In accordance with the present invention, it has been further discovered that the desired catalyst state, as evidenced by proper particle size distribution, average particle density and surface adsorption properties, may be established by regulated disintegration of the reduced, and preferably carbided, catalyst in the presence of a stream of synthesis gas, at an elevated temperature, within a critical range substantially above normal synthesis temperature at which the catalyst, a typical reduced catalyst powder, the major portion of which comprises particles larger than 80 microns, is caused to disintegrate, spall, flake or otherwise break up at a relatively rapid rate, progressively approaching a condition where about 65 to 75 per cent of the particles are in the 10 to 80 micron size range, the average particle density is 3.0 to 4.0 and the catalyst surface adsorbs 30 to 45 milliliters of ammonia per gram.

The temperature of catalyst conditioning or disintegration may vary somewhat with the specific catalyst, but is usually from about 50 to 100° F. above operating temperature for optimum yield of liquid hydrocarbons; that is to say, above about 700° F., and usually about 725° F. Its incidence is characterized by the phenomenon of a relatively sharp, progressive and continual decrease in catalyst particle size to the foregoing critical range of size distribution readily recognizable by periodic screen or other particle size analysis of catalyst samples. The above-mentioned corresponding decrease in average particle density of the catalyst and a sharp increase in adsorptive surface occur simultaneously with particle disintegration.

It is to be emphasized that while some fines formation may tend to occur at lesser temperatures, neither the required critical size distribution nor the desired surface adsorptivity will be realized. For example, after running for a period of from eight to ten days at a temperature above about 640° F. but not over 670° F., the density of the powdered catalyst will drop to about 3.0, but only about 40 per cent of the catalyst particles are in the 10–80 micron size range, the surface adsorptivity is under 10 milliliters of ammonia per gram of catalyst, and the liquid hydrocarbon yield is not substantially over half of that realizable after conditioning at the aforementioned critical temperature range.

Advantageously, such conditioning is carried out under superatmospheric operating pressure. It may be curtailed at any time by reduction in temperature below the critical range stated. Moreover, brief repetition of such treatment may be used to improve a catalyst which, in the course of use, has, for any reason, accumulated undesired proportions of particles larger than 80 microns and of heavier density than 4.0, or has fallen below the aforesaid range of ammonia adsorptivity.

Accordingly, the present invention contemplates subjecting a powdered, reduced and preferably partially carbided iron-containing catalyst containing approximately 70 to 80 per cent iron carbide, advantageously in dense fluid phase condition, to passage of synthesis gas, at a temperature above the normal operating range, in the vicinity of 725° F. at which the particles become progressively adjusted to the desired size distribution in the 10 to 80 micron size range, density decrease, and increase in surface adsorptivity, continuing operation at such temperature level until the desired particle size distribution, density and adsorptive surface have been established and the yield of liquid products sharply increased, and thereafter lowering the temperature to a reduced operating range at which the high yield of liquid hydrocarbons continues at moderate rate of catalyst disintegration for a prolonged period of on-stream operation. Continuation of the desired high yield is promoted by withdrawing from the reaction zone the ultimate fines, that is, catalyst particles in the 0–10$\mu$ range, formed by such disintegration. In order to compensate for such catalyst withdrawal, the reaction zone is supplemented with complementary additions of fresh reduced catalyst.

It is important in lowering the temperature from the range of rapid disintegration to effect the change at a gradual rate since too rapid a drop in temperature may cause the production of desired liquid fractions to diminish appreciably.

Usually the temperature may be rapidly lowered to about 700° F., if thereafter the rate of temperature decrease is lowered, for example, 5° F. every two hours. If a decrease in oil yield is encountered due to too rapid cooling, it is possible to regain the desired yield by raising the temperature slightly, for example, 10 to 20° F., after which the slow decrease in temperature may be resumed as before.

It is believed significant that when decrease in oil yield is encountered during cooling, the catalyst adsorptivity, as determined on the basis of withdrawn samples, ranges below 20 milliliters of ammonia per gram. When maximum oil yield is regained, as above, adsorptivity returns to the range of 30 to 45 milliliters of ammonia per gram. Accordingly, a condition of normal continuous operation is ultimately reached with the catalyst in an optimum state of particle size distribution, density and adsorptive surface.

It is particularly important to note that continuous maintenance of this optimum catalyst state requires careful selection of the normal or on-stream operating temperature. Presumably, with the catalyst disclosed above, and at proper operating temperature, a continual sloughing off of minute surface layers occurs in such a way as to remove finally spent layers as particles smaller than 10 microns, hereinafter called ultimate fines, and thus expose fresh active surfaces. Conversely, at lower temperatures, the spent surface layers remain in situ and impair contact of the reactant gases ($H_2$ and $CO$) with fresh active catalyst surfaces.

This observation is borne out by, first, the fact that the rate of formation of ultimate fines decreases with reaction temperature, second, the fact that at and below a critical temperature (and corresponding rate of fines formation) liquid hydrocarbon yield is sharply impaired, and third, the resulting decrease in surface activity which is experienced at and below said critical temperature. For example, actual laboratory control measurements of catalyst surface activity by the ammonia method exhibit continuously an adsorptivity in the range of about 20–45 milliliters of ammonia per gram sample of catalyst when the process is operated above the said critical temperature under the continuing high yield induced by conditioning in accordance with the present invention. Below such critical temperature where substantial loss of yield is encountered, the adsorptivity progressively falls below 10 milliliters $NH_3$ per gram.

In any event, it has been discovered that the optimum high yield of liquid products will continue only where the operating temperature is above a value corresponding to a critical rate of formation of ultimate fines, namely, catalyst particles less than about 10 microns. At lower temperatures, the rate at which ultimate fines are formed decreases and oil yield becomes progressively lower.

In a catalyst conditioned as above, the critical temperature for constant product yield usually occurs at about 640 to 670° F. While some variation may be encountered depending on the starting catalyst material and the modifying agents employed, appreciably lower temperatures mean progressive loss of yield. Higher temperatures, as high as 700° F. may be used, but are objectionable insofar as the rate of loss of catalyst through the formation of fines tends to become excessive. Accordingly, the invention advantageously contemplates continuous operation, preferably within the range up to 50° F. above, but not below, the lowest temperature at which oil yield remains approximately undiminished.

It is believed surprising that, operating as above, the catalyst lost in the form of particles below about 10 microns may be made up without impairment in yield by continual or periodic addition of ordinary reduced catalyst powder, the major portion of which comprises particles greater than 80 microns in diameter. This follows, first, from the fact that a typical, reduced and powdered catalyst will not upset the improved yield provided that the necessary proportion of particles in the 10 to 80 micron size range is present, and, second, because in the presence of a large predominance of the conditioned particles, the added catalyst tends to assume a corresponding state, possibly by transfer of the coke (carbon) present in the particles of preconditioned catalyst to the newly added, reduced catalyst. In other words, the added catalyst rapidly assumes the desired density and particle size, and an adsorptive surface of 20 to 45 milliliters of ammonia adsorbed per gram of catalyst.

Accordingly, the invention contemplates limiting the addition of make-up catalyst such that the resulting admixture of fresh and used catalyst never contains less than about 65 per cent of particles in the 10 to 80 micron size range. In short, each incremental addition of fresh make-up catalyst, the major portion of which consists of particles larger than 80 microns, must be restricted such that the 10 to 80 micron fraction of the resulting mixture is maintained within 65 to 85 per cent and preferably 65 to 75 per cent of the total. It will be apparent that this affords an additional reason for holding the rate of fines formation to as low a value as is consistent with optimum product yield, and thus permits continuous operation without regard to catalyst loss as fines, and without shutdown for catalyst regeneration, reconditioning or replacement.

Advantageously, therefore, operating temperature is adjusted just above that at which liquid oil production remains substantially uncurtailed, with a minimum rate of catalyst loss. Thereafter, the losses are made up by addition of ordinary powdered, reduced catalyst, so added that the resulting proportion of particles larger than 80 microns never exceeds 40 per cent and preferably 35 per cent, and is never less than 15 per cent.

The invention has particular application to the synthesis of hydrocarbons through the agency of unsupported iron catalyst, as contrasted with a catalyst formed by depositing an active material upon an inert carrier. It is broadly applicable to fixed or moving bed operations, but is particularly advantageous where the catalyst is held in a dense fluid phase by the upflow of reactants. Preferably, the linear velocity of the gases may be adjusted to that value in the neighborhood of about one foot per second, at which particles substantially greater than about 10 microns in diameter tend to remain in the reaction zone and spent particles substantially finer than 10 microns are carried out by entrainment in the effluent product gases.

Any particles larger than 10 microns entrained at higher gas flows can be separated from the product gases by cyclone, filter, electrostatic or other conventional separating means and returned to the reaction zone while fines smaller than 10 microns are permitted to pass out of the system.

In either case, the continual discarding of the ultimate fines is advantageous because, as indicated above, they comprise essentially that portion of the catalyst which is exhausted and no longer of any benefit in the present process. Thus, the catalyst remaining in the reaction zone is free from the usual requirements for catalyst revivification, regeneration or reconditioning.

Provision is preferably made for uniform temperature control in the reaction zone, as for example, by the arrangement of adequate, well distributed cooling surfaces in contact with the catalyst.

From the standpoint of economy in catalyst consumption, an approximately uniform distribution of catalyst particles in the 10 to 80 micron size range is most advantageous. Where, for example, excessive proportions of this fraction, as for example, 50 per cent thereof, are below 20 microns in diameter, there is an inevitable tendency for undesired carryover of particles with the product gas and a similarly high loss of catalyst from the system. However, when associated with a more uniform distribution of larger particles within the 10 to 80 micron range, loss from this source may be reduced to a low value. Preferably, therefore, not more than 30 per cent and preferably not more than 15 to 20 per cent of the 10 to 80 micron fraction is in the 10 to 20 micron size range.

In order to more clearly illustrate the practice of the present invention, reference is hereinafter had to one specific embodiment thereof.

A reaction chamber, comprising a cylindrical vessel about ten inches in internal diameter and provided with three equally spaced, vertically extending, two-inch cooling tubes, is provided with a charge of dry powdered iron oxide particles. The cooling tubes are provided internally with water under controlled pressure such that the temperature of the catalyst mass may be regulated within desired narrow limits.

The powdered charge of catalyst has a composition equivalent to equal parts of magnetized $Fe_3O_4$ and ferric oxide ($Fe_2O_3$), with about five per cent of inert solids and is, in physical form, more or less representative of an iron oxide powder produced by conventional grinding methods, having a screen analysis substantially as follows:

| | Per cent |
|---|---|
| Retained on 35 mesh (420+ microns) | 15.0 |
| Retained on 100 mesh (419–149 microns) | 18.0 |
| Retained on 150 mesh (148–105 microns) | 17.0 |
| Retained on 200 mesh (104–74 microns) | 11.0 |
| Retained on 250 mesh (73–62 microns) | 3.0 |
| Retained on 325 mesh (61–44 microns) | 6.0 |
| Passing thru 325 mesh (43–0 microns) | 30.0 |

Only slightly over 40 per cent of the catalyst comprises particles less than 80 microns in size.

Reduction of the powder is effected by passing substantially pure hydrogen upwardly through the bed of particles at a temperature from about 750 to 850° F., and a linear velocity of about .45 to 1.5 standard feet per second, sufficient to aerate the particles into a state of dense phase fluidization. Pressure is held between 200 and 400 pounds per square inch gauge.

The effluent gas is withdrawn, cooled to about 70° F. to condense moisture, the condensate is separated and the residue recycled continuously. After reduction of the oxide, which is usually substantially completed within about 24 hours, the catalyst has a density of about 7.0 to 7.3.

Particle densities referred to herein are determined by a pycnometer, using carbon tetrachloride as the liquid medium, after first relieving the particle surfaces of adsorbed gas.

After reduction, the hydrogen flow is terminated, the catalyst bed is allowed to cool to 600° F., and carbiding initiated by introducing a fresh feed of synthesis gas, preferably containing essentially hydrogen and carbon monoxide in about the molar ratio of 2:1.

For example, with a fresh feed containing hydrogen and carbon monoxide in the ratio of 1.7:1, the gas is passed upwardly at a pressure of from about 200 to 400 pounds per square inch gauge, with recycle of the normally gaseous products of reaction to the reactor inlet at the approximate relative volume ratio of 1.5 volumes of recycle per volume fresh synthesis gas. The linear velocity of upflow in the reactor is about one foot per second, at which the reduced catalyst particles form a uniform dense fluid phase.

Carbiding may be carried out at any temperature, from, for example, 400° F. up to 650° F., preferably with an increase in temperature in this range. For instance, the temperature may be raised gradually over a period of from 8 to 10 hours from 600 to 650° F., at which time production of liquid hydrocarbons and oxygenated hydrocarbons occurs at a substantial rate. As indicated above, the effluent gasiform reaction products withdrawn from the catalyst are condensed and separated at, for example, 70 to 100° F., the desired liquid hydrocarbons and associated oxygenated hydrocarbons, if any, being recovered as an oil layer, with part of the oxygenated hydrocarbons in the water layer, the residual normally gaseous stream becoming available for recycle as indicated.

The carbided catalyst is thereafter subjected to conditioning such that the normal yield of the so-called oil layer is substantially increased.

To this end, the density of the catalyst and the particle size distribution are adjusted by controlled high temperature disintegration. For example, a typical size distribution of the above carbided catalyst is as follows:

| | Per cent |
|---|---|
| Retained on 35 mesh (420+ microns) | 3.0 |
| Retained on 100 mesh (419–149 microns) | 15.0 |
| Retained on 150 mesh (148–105 microns) | 18.0 |
| Retained on 200 mesh (104–74 microns) | 19.0 |
| Retained on 250 mesh (73–62 microns) | 4.0 |
| Retained on 325 mesh (61–44 microns) | 15.0 |
| Passing thru 325 mesh (43–0 microns) | 26.0 |

An analysis by the "sedimentation method" shows that about 48 per cent of the particles fall within the size range of from 10 to 80 microns. This may vary widely depending on the starting powder and the type of grinding employed. For example, the 10 to 80 micron range of particle size frequently includes 20 to 40 per cent of the total mass of particles with those larger than 80 microns amounting to at least 60 to 80 per cent of the total. Typical particle density of the thus carbided catalyst is about 5.5.

To condition the catalyst, the carbided mass is raised gradually above 700° F., other operating conditions being maintained as above, preferably with a recycle rate of about 1.5:1 and the particles uniformly in a dense fluid phase under uniform temperature control. At or about 725° F., particle disintegration takes place with progressive redistribution into the particle size range covering approximately from 10 to 80 microns. Usually, the desired distribution, namely, with about 65 to 75 per cent of the particles in the 10 to 80 micron size range, is realized, with a freshly carbided catalyst, in about 48 hours and seldom in excess of 72 hours.

When particle size analysis of withdrawn samples indicates the establishment of the desired size distribution and an average catalyst particle density within the range of about 2.5 to 4.5, the temperature of the catalytic mass is immediately lowered to about 700° F., and thereafter cooling is effected at a regulated rate such that oil yield is not materially impaired. The catalyst now has an adsorptive surface activity of 20 to 45 milliliters of ammonia per gram of catalyst, and the yield of liquid hydrocarbons is materially in excess of that which would prevail in the case of ordinary carbided catalyst.

As indicated above, a temperature decrease of about 5° F. every two hours is usually suitable. In this manner, the catalyst bed temperature is gradually worked down to about 640 to 660° F. without loss of yield.

As noted above, the final temperature of operation may vary to some extent with the specific catalyst employed, but is preferably held at the lowest level at which the optimum yield is continuously maintained. Such temperature level in any event may be determined in practice by observing that temperature at which a tendency towards decreasing yield is first experienced. Thereafter, operation may be indefinitely continued under slightly higher temperature, at which the yield remains constant. With an appropriate linear velocity of reactant flow in the range mentioned above, the ultimate fines less than 10 microns in diameter are continuously entrained in the effluent products of reaction, and are withdrawn from the reaction zone while larger particles remain in the dense fluid phase catalytic mass. The withdrawn particles are separated by a suitable cylone or other means and discarded.

Operating as above, the rate of loss with an approximately 300 to 400 pound charge of catalyst may amount to about 10 to 15 pounds every 24 hours. By adding corresponding amounts of the reduced catalyst to replace the removed "fines" as indicated above, the desired inventory of effective catalyst is maintained at continuing high rate of yield over prolonged periods of on-stream operation lasting several weeks or longer, providing the 80+ particles are maintained between 15 and 40 per cent of the reactor bed.

Preferably, therefore, addition of unconditioned make-up catalyst is limited to 10 per cent of the catalyst mass in any 24-hour period and is made in limited increments such that the resulting mixture always remains within the range of size distribution at which approximately 65 to 75 per cent of the total particles in the 10 to 80 micron size range. As a result, the contact mass continually retains an average particle density of approximately 3.0 to 4.0 and an average adsorptive surface (ammonia method) of 20 to 45 milliliters of ammonia per gram of catalyst.

The following table compares the results of a few actual test runs showing the relative particle size distribution of conditioned particles of iron catalyst with particular reference to the percentage falling within the 10 to 80 micron size range, the average particle density of the catalyst, the surface adsorption (as measured by the ammonia method) and the continuous yield of liquid oil layer recovered from the effluent products.

| Run | I | II | III | IV | V | VI |
|---|---|---|---|---|---|---|
| Percent 10–80 m. particles | 70 | 70 | 50 | 40 | 20 | 75 |
| Cat. Density | 2.7 | 3.0 | 4.7 | 4.8 | 4.7 | 3.5 |
| Adsorptive Surface (ml. Ammonia/gram Cat.) | 30 | 40 | 7 | 8 | 6 | 40 |
| Yield (Gals. Oil/Hr.) (Basis 6,000 S. C. F. H. Fresh Feed) | 4.8 | 4.9 | 2.9 | 2.9 | 2.4 | 5.0 |

In each case, the figures are based upon a fresh feed synthesis gas of about 6,000 standard cubic feet per hour, containing hydrogen and carbon monoxide in the molar ratio of about 1.7:1 and containing in addition about 2 per cent carbon dioxide, about 2 per cent of methane and about 1.5 per cent of nitrogen. In the runs I to VI, the reaction was carried out at a pressure of approximately 200 p. s. i. g. and a reactor temperature of approximately 640–660° F. The pressure during run VI was about 313 p. s. i. g.

A recycle of the normally gaseous fraction of the effluent products of the reaction zone was maintained to the inlet thereof, in each case, at a volume ratio basis. The reaction zone contained 250 to 300 pounds of catalyst. The catalyst used in runs I, II and VI resulted from preconditioning at 725° F. in accordance with the procedure described in the foregoing example. It is important to note that the particle size distribution, average particle density and the surface adsorption fall within the critical ranges for maximum oil yield, and correspond to actual yields of about 5 gallons per hour.

In contrast, runs III, IV and V, all characterized by low oil yield of less than 3 gals./hr., fall outside the critical ranges of particle size distribution, density and surface adsorption. The catalyst used in these runs was identical in origin and treatment with that of runs I, II and VI except that the "preconditioning period" at 725° F. was omitted and running instituted between 640 to 670° F. reactor temperature.

From the foregoing it is apparent that in the case of the catalyst selected by way of example, the yield of liquid oil fractions is materially and surprisingly improved to a range of approximately five gallons per hour as compared with the maximum yield of less than three gallons per hour, on the same basis, realized with unconditioned catalyst.

It is important to emphasize that the observed results tabulated above with respect to runs I–VI represent settled operation maintainable continuously without material variation. A decrease in operating temperature of 10–20° F. below that indicated is immediately followed by a decrease in yield to the range represented by runs III, IV and V. However, at the actual operating range, settled operation is continued indefinitely by continuously supplementing the catalyst mass with additional, fresh reduced catalyst corresponding in amount to the fines carried out of the reaction zone in the product stream.

By way of illustrating the effect of variation in continuous operating temperature of the foregoing catalyst, the following table indicates approximately the rate of loss of ultimate fines (less than about 10 microns) encountered in runs I, II and VI from a fluidized mass of about 300 pounds of catalyst, conditioned as above, at different temperatures during continuous operation.

| Operation | Temperature, °F. | Catalyst Carried Over in 24 Hours, lbs. |
|---|---|---|
| A | 640–650 | 10 |
| B | 655–665 | 25 |
| C | 670–680 | 43 |

Typical particle size distribution of each of the respective catalysts listed in the foregoing table, will, after settled operation, be as follows:

| Microns | Weight Percent of Total Catalyst | | | | |
|---|---|---|---|---|---|
| | 0–10 | 10–20 | 20–40 | 40–80 | 80+ |
| A | 5 | 10 | 20 | 40 | 25 |
| B | 5 | 20 | 40 | 10 | 25 |
| C | 5 | 45 | 20 | 5 | 25 |

It is accordingly profitable to operate at temperatures not substantially greater than the 640 to 660° F. temperature range, at which loss of catalyst is minimized and continuous operation with maximum oil yield is made possible.

In general, the optimum range of particle size distribution is as follows:

|   | Per cent |
|---|---|
| Total (10–20 micron particles) | 10–20 |
| 65 to 75 : 20–40 micron particles | 20–30 |
| Per cent (40–80 micron particles) | 25–35 |

It is important to point out that from 15 to 25 per cent coarse particles larger than 80 microns is necessary from the standpoint of maintaining a desirable uniform dense phase of catalyst particles which will be retained in the reaction zone.

In addition, excessive disintegration beyond the ranges indicated above tends to result in a reduction in catalyst density to a value below 2.5, at which catalyst consumption reaches an uneconomical rate when the reaction temperature is sufficiently high to give the desired oil yield. Below the minimum critical temperature of good oil yield (i. e., substantially below 640° F.) catalyst consumption is alleviated only with a substantial sacrifice of desired liquid hydrocarbons.

The present invention contemplates incorporation in the catalyst of any of the conventional activators and promoters, as for example, alkali metal or alkaline earth metal oxides, alumina, thoria, titania, zirconia and others of which these are typical. The extent of their addition is usually 0.5 to 5.0 per cent. These may be incorporated in the original oxide in any desired manner or may be added during the course of manufacture, for example, by impregnating the powder with a suitable aqueous solution and thereafter drying.

As above intimated, the novel, improved high yields of liquid hydrocarbons, by the use of a catalyst preconditioned as above, at a temperature above approximately 725° F., may decrease as the result of (1) too rapid decrease in temperature from the elevated temperature of preconditioning to the normal operating range above about 640° F. so that high surface adsorptivity of the catalyst is decreased, (2) introduction of fresh catalyst at an excessive rate such that the foregoing critical conditions of operation are exceeded, (3) a decrease in reactive temperature substantially below about 640° F. at which catalyst disintegration is insufficient to maintain adequate fresh adsorptive surfaces, or (4) combinations of any of the foregoing.

It is important to emphasize that such a decrease in yield, in the case of a catalyst preconditioned as above may be overcome and the optimum catalyst properties and maximum yield of oil restored by raising the temperature sufficiently in the range of 640–725° F. or above for a brief period. Usually a temperature increase to about 660° F. will be sufficient except in the case where quite excessive additions of fresh reduced catalyst have been made so that the catalyst size distribution is substantially outside the critical range disclosed above. In the latter event, higher temperatures up to about the critical temperature above 700° F. may be required. After restoration of the required active adsorptive surfaces the temperature may be slowly lowered to the appropriate normal operating range.

While recycle operation has been disclosed, and is usually most advantageous, the invention contemplates once through, staged, or any other desired technique of contact. In general, the examples given in the present specification are directed primarily to the production of hydrocarbons predominantly in the motor gasoline boiling range and the liquid oil layer product referred to is composed primarily of such fractions.

Obviously, many other specific modifications and adaptations of the present invention, as hereinbefore set forth, may be made without departing from the spirit and scope thereof and therefore, only such limitations should be imposed as are indicated in the appended claims.

I claim:

1. In the process of catalytically converting a synthesis gas comprising essentially hydrogen and carbon monoxide into desired products of the class consisting of hydrocarbons, oxygenated hydrocarbons and mixtures thereof, the improvement which comprises substantially increasing the yield of desired, normally liquid products by passing such synthesis gas through a reaction zone in contact with a powdered, solid particle, iron-containing synthesis catalyst effective for the production of desired liquid products, the major portion of which comprises particles larger than 80 microns, continuing passage of said synthesis gas in contact with the catalyst at an elevated conditioning temperature above 700° F. and not above about 800° F., at which the catalyst particles experience a selective decrease in density and alteration of the particle size distribution toward the range of from 10 to 80 microns and an increase in surface adsorptivity, continuing passage of the said synthesis gas at said temperature of disintegration for a substantial period of time until the average density of said catalyst falls in the range of from about 2.5 to about 4.5 density, and a particle size distribution has been established such that about 60 to 85 per cent of the particles falls within the size range of from about 10 to 80 microns, and the surface adsorptivity increases into a range of 20 to 45 milliliters of ammonia per gram of catalyst said conditions being accompanied by a substantially increased yield of said desired products of reaction, thereafter substantially lowering the reaction temperature at a rate at which the yield of desired liquid products is substantially unaffected to a continuous operating temperature in the range of about 640-690° F., and thereafter continually recovering liquid products of reaction from the effluent reaction products.

2. The method according to claim 1, wherein the said elevated conditioning temperature is about 725° F.

3. The process according to claim 1, wherein said continuous operating temperature is in the range of from about 640 to 670° F.

4. The process according to claim 1, including the subsequent step of withdrawing fine, spent catalyst particles less than about ten microns in diameter from the catalyst mass, and replacing the withdrawn catalyst by adding reduced catalyst powder, the major portion of which comprises particles larger than 80 microns in diameter, the replacement catalyst particles being added in limited increments such that the resulting mixture retains the said particle size distribution, density and adsorptive surface.

5. In the process of preparing an improved catalyst for the catalytic conversion of synthesis gas comprising essentially hydrogen and carbon monoxide into desired products of the class consisting of hydrocarbons, oxygenated hydrocarbons and mixtures thereof, the steps which comprise subjecting an iron-containing synthesis catalyst in the form of a powder the major portion of which comprises particles larger than 80 microns, to contact with a synthesis gas at an elevated temperature about 725° F., at which catalyst is progressively disintegrated into particles of lesser density, and greater surface adsorptivity, maintaining said elevated temperature of disintegration for a substantial period of time until about 65 to 75 per cent of the catalyst particles are in the 10 to 80 micron size range and have an average particle density of approximately 3.0 and 4.0, and a surface adsorptivity in the range of 30 to 40 milliliters of ammonia per gram of catalyst said conditions being accompanied by a substantially increased yield of said desired products of reaction, reducing the temperature of said catalyst mass at a rate such that the surface adsorptivity does not fall below 20 milliliters of ammonia per gram of catalyst and the yield of desired liquid products is not materially impaired, to an operating temperature substantially below 725° F. and above about 640° F. at which the yield of liquid hydrocarbons experiences a substantial decrease, and thereafter continuously maintaining said temperature within said range with production of a materially increased yield of liquid hydrocarbons.

6. In the preparation of a catalyst effective for converting a synthesis gas comprising essentially hydrogen and carbon monoxide into substantially improved yields of products of the class consisting of normally liquid hydrocarbons, oxygenated hydrocarbons and mixtures thereof, the steps which comprise supplying a reaction zone with a powdered iron compound capable of being reduced to metallic iron by hydrogen, reducing such compound with gaseous hydrogen at an elevated temperature, forming a product the major portion of which comprises particles greater than 80 microns in diameter, thereafter passing said synthesis gas in contact with said powder at an elevated temperature about 725° F., at which the catalyst experiences progressive reduction in density and selective particle disintegration into particles less than about 80 microns and increased surface adsorptivity, maintaining said elevated temperature of disintegration for a substantial period of time until the average catalyst particle density is in the range of from 2.5 to 4.5; the particle size distribution comprises from about 60 to 85 per cent within the 10 to 80 micron size range, and the adsorptive surface is in the range of about 20 to 45 milliliters of ammonia per gram of catalyst said conditions being accompanied by a substantially increased yield of said desired products of reaction, and thereafter reducing the temperature to a normal operating level of from about 640 to 690° F. at a rate such that surface adsorptivity and liquid hydrocarbon yield is not substantially impaired while continuously maintaining the passage of said synthesis gas in contact with the catalyst.

7. In the process of catalytically converting synthesis gas comprising essentially hydrogen and carbon monoxide into desired products of the class consisting of hydrocarbons, oxygenated hydrocarbons and mixtures thereof, the improvement which comprises substantially increasing the yield of desired, normally liquid products by subjecting a solid particle, iron type synthesis catalyst the major portion of which comprises particles larger than 80 microns, to contact with a synthesis gas at an elevated temperature substantially above 700° F. and not above about 800° F. at which the catalyst progressively disintegrates into particles of lesser density and increased adsorptive surface, maintaining said elevated temperature for a substantial period of time until about 65 to 75 per cent of the catalyst particles are in the 10 to 80 micron size range, and have an average particle density of 3.0 to 4.0, and an adsorptive surface of 30 to 45 milliliters of ammonia per gram of catalyst said conditions being accompanied by a substantially increased yield of said desired products of reaction, thereafter effecting contact between said synthesis gas and said catalyst at a temperature below about 700° F. but above about 640° F., at which the surface adsorption remains between 20 and 45 milliliters of ammonia per gram of catalyst during continuous operation, continuously forming fine, spent catalyst particles less than about 10 microns in diameter, withdrawing such fine catalyst particles from the reaction zone and supplementing the contact mass by adding thereto reduced catalyst powder more than 40 per cent of which comprises particles greater than 80 microns in diameter, said supplementary catalyst additions being made in limited increments such that the proportion of particles greater than 80 microns in the resulting mixture does not exceed about 40 per cent, the density remains between 3.0 and 4.0 and the surface adsorptivity remains between 20 and 45 milliliters of ammonia per gram of catalyst.

8. In the catalytic conversion of synthesis gas comprising hydrogen and carbon monoxide into hydrocarbons, oxygenated hydrocarbons and mixtures thereof, by contact with a solid particle, iron catalyst, the improvement which comprises substantially increasing the yield of desired liquid products by continually passing said synthesis gas in contact with said catalyst, the major portion of which comprises particles larger than 80 microns, effecting said contact at an elevated conditioning temperature in the range of about 725–800° F. at which the solid particles of catalyst undergo an increased rate of disintegration, maintaining the temperature continuously in the said range for a substantial period of time such that about 60–85% of catalyst particles fall within the 10–80 micron size range, the particle density is within the range of 2.5–4.5 and the surface adsorptivity is in the range of 20–45 milliliters of ammonia per gram of catalyst, thereby realizing a substantially increased yield of said desired products of reaction and thereafter lowering the reaction temperature at a slow, gradual rate such that said increased yield is maintained at a continuous operating temperature in the range of 640–690° F.

9. The method according to claim 8 wherein said final operating temperature is in the range of about 640–670° F.

10. The method according to claim 8 wherein said elevated conditioning temperature is maintained for a period of about 48 hours.

11. The method according to claim 8 wherein said elevated conditioning temperature is maintained for a period of time such that 65–75% of the catalyst particles reside in the 10–80 micron size range, the catalyst particle density falls in the range of 3.0–4.0 and surface adsorptivity is in the range of 30–40 milliliters of ammonia per gram of catalyst.

12. The method according to claim 8 wherein the lowering of said temperature is effected at a rate not substantially greater than about 5° F. every two hours.

MARCUS T. KENDALL.

References Cited in the file of this patent

UNITED STATES PATENTS

| Number | Name | Date |
|---|---|---|
| 2,251,554 | Sabel et al. | Aug. 5, 1941 |
| 2,360,787 | Murphree et al. | Oct. 17, 1944 |
| 2,391,334 | Nicholson | Dec. 18, 1945 |
| 2,417,164 | Huber | Mar. 11, 1947 |
| 2,451,879 | Scharmann | Oct. 19, 1948 |
| 2,458,870 | Ogorzaly | Jan. 11, 1949 |
| 2,476,920 | Segura | July 19, 1949 |
| 2,510,823 | Krebs | June 6, 1950 |
| 2,533,694 | Safford | Dec. 12, 1950 |
| 2,601,121 | Mattox | June 17, 1952 |
| 2,615,910 | Cier | Oct. 25, 1952 |